United States Patent
Valent et al.

(10) Patent No.: US 7,762,107 B2
(45) Date of Patent: Jul. 27, 2010

(54) COUNTERWEIGHT FOR WASHING MACHINE TUB

(75) Inventors: Lucio Valent, Pordenone (IT); Fabio Poloni, San Vito al Tagliamento (IT)

(73) Assignee: Electrolux Home Products Corporation N.V., Zaventem (BE)

( * ) Notice: Subject to any disclaimer, the term of this patent is extended or adjusted under 35 U.S.C. 154(b) by 797 days.

(21) Appl. No.: 10/579,300

(22) PCT Filed: Nov. 24, 2004

(86) PCT No.: PCT/EP2004/053067

§ 371 (c)(1),
(2), (4) Date: Jan. 26, 2007

(87) PCT Pub. No.: WO2005/054562

PCT Pub. Date: Jun. 16, 2005

(65) Prior Publication Data

US 2007/0220928 A1    Sep. 27, 2007

(30) Foreign Application Priority Data

Dec. 5, 2003    (EP)    .................................. 03028008

(51) Int. Cl.
D06F 29/00    (2006.01)
D06F 35/00    (2006.01)

(52) U.S. Cl. ...................................................... 68/23.1
(58) Field of Classification Search ................... 68/23.2, 68/212

See application file for complete search history.

(56) References Cited

U.S. PATENT DOCUMENTS 4,502,303 A    3/1985    Wasemann
5,211,038 A    5/1993    Valent

FOREIGN PATENT DOCUMENTS

| EP | 0 623 436 | 11/1994 |
| GB | 2 044 298 | 10/1980 |
| GB | 2 241 251 | 8/1991 |
| JP | 2002-257198 | 9/2002 |

*Primary Examiner*—Michael Barr
*Assistant Examiner*—David Cormier
(74) *Attorney, Agent, or Firm*—Pearne & Gordon LLP

(57) ABSTRACT

Counterweight, connectable to a washing machine tub (2), comprising an hollow shell (3) of U-shaped cross-section for containing a concrete ballast mass (4) poured therein, said shell (3) is integrally provided in one piece with two foldable members (5) adapted to close enlarged lower portions (6) of said shell (4) in order to encapsulate said concrete ballast mass (4).

3 Claims, 3 Drawing Sheets

COUNTERWEIGHT FOR WASHING MACHINE TUB

The present invention refers to a counterweight, particularly for washing machine tub. Clothes washing machines are generally known to be usually provided with counterweights which serve as means for ballasting the same machines so as to reduce the dynamic stresses that are imparted during the rotation of the drum in the washing and, above all, the high-speed spin traction phases of the clothes washing process. Such counterweights are generally secured to the exterior of the wash tub and are made in a variety of manners. Traditionally, they are formed by concrete blocks that are given appropriate shapes according to the position in which they are to be mounted, for instance on the front wall or the rear wall of the tub, or even on top of the same tub. Fastening means adapted to co-operate with corresponding attachment means provided on the wall of the tub are inserted in such concrete blocks so as to protrude from said blocks accordingly.

Counterweights are known which are obtained by blow moulding hollow bodies of plastic material that are then filled with concrete or any other material having similar properties.

Counterweights are also known, which are formed by two annular shells of plastic material adapted to enclose blocks of concrete or any other suitable material (U.S. Pat. No. 5,211, 038).

These kind of counterweight have a high production cost, a limited maximum density, a non-constant weight because the difficulty of filing the plastic casing, poor or no adhesion between the plastic casing and the filling material.

Known preferred counterweights which do not have the above-mentioned drawbacks are formed by moulded flange of plastic material in the shape of a continuous hollow ring with a U-shaped cross-section, said flange being further provided with radial ribs adapted to accommodate, and keep in position, concrete masses (GB-A-2 044 298).

However such counterweight also have drawbacks since the concrete mass undergoes pulverisation and/or crumbling and the resulting powder and small fragments of material can damage the electromechanical components arranged in correspondence to the bottom of the washing machine casing. This is particular unpleasant because a larger number of failure increases the maintenance cost.

The aim of the present invention is therefore to solve the noted problems, eliminating the drawbacks of the cited known art.

A further object of the present invention is to provide a simple and reliable counterweight, which is produced at reduced costs.

The counterweight of the present invention is embodied with the design and construction characteristics as essentially described and defined with particular reference to the appended claims.

Anyway, features and advantages of the present invention will become more clearly evident from the description that is given below by way of a non-limiting example with reference to the accompanying drawings, in which.

Figure 1:
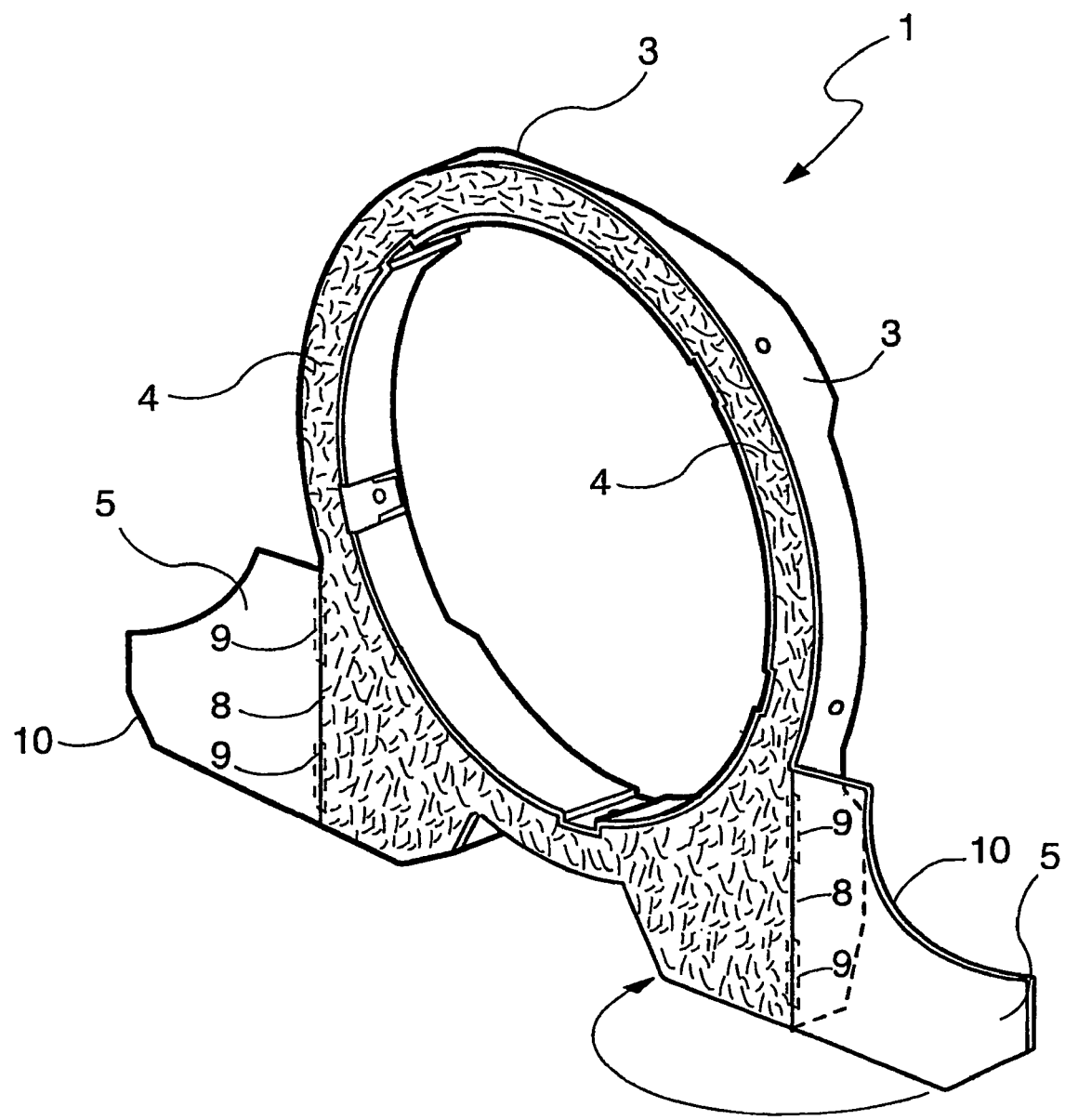
FIG. 1 is a perspective view of a counterweight according to the present invention.
Figure 2:
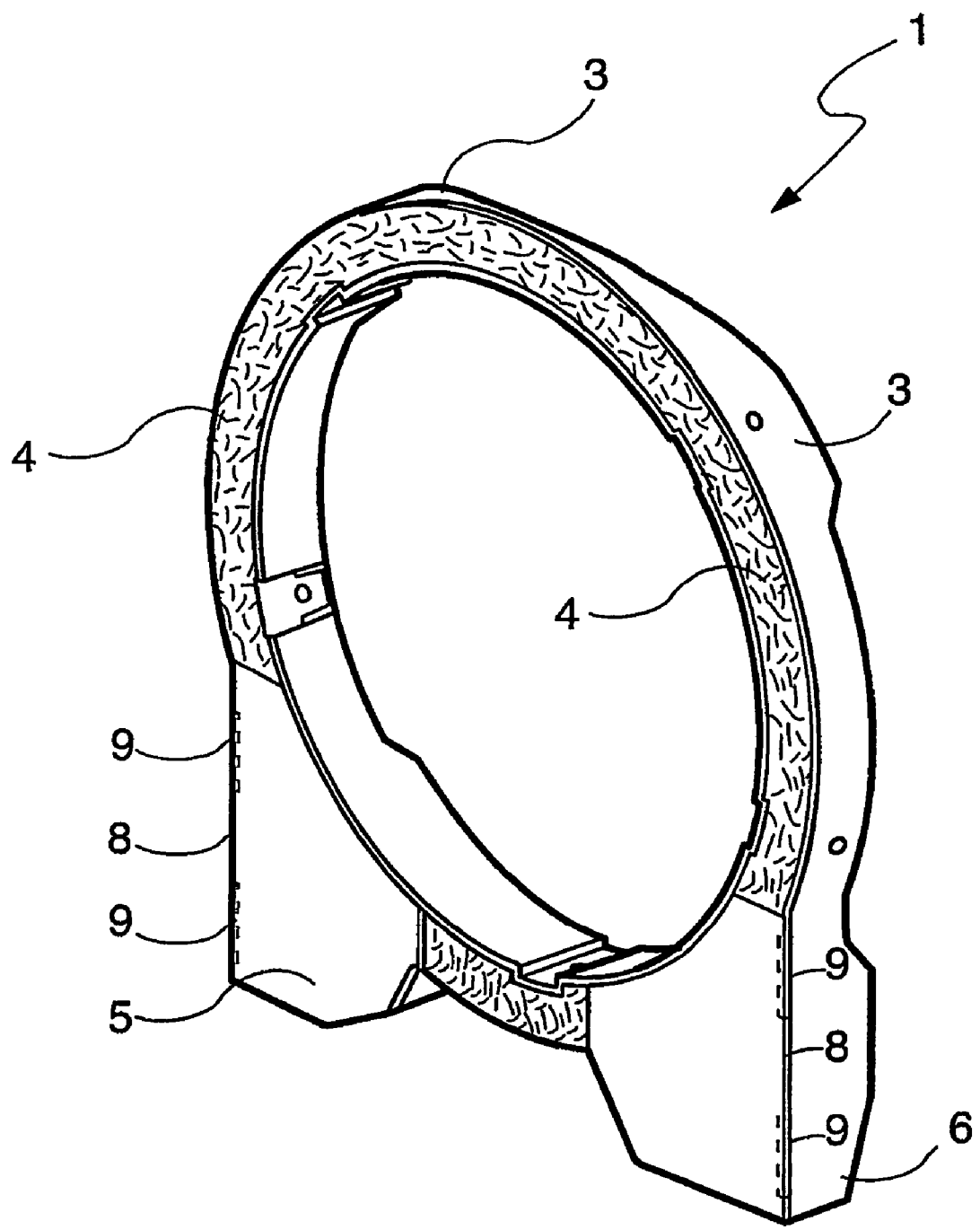
FIG. 2 is a perspective view of the counterweight shown in FIG. 1, with the foldable members closed on the shell.
Figure 3:
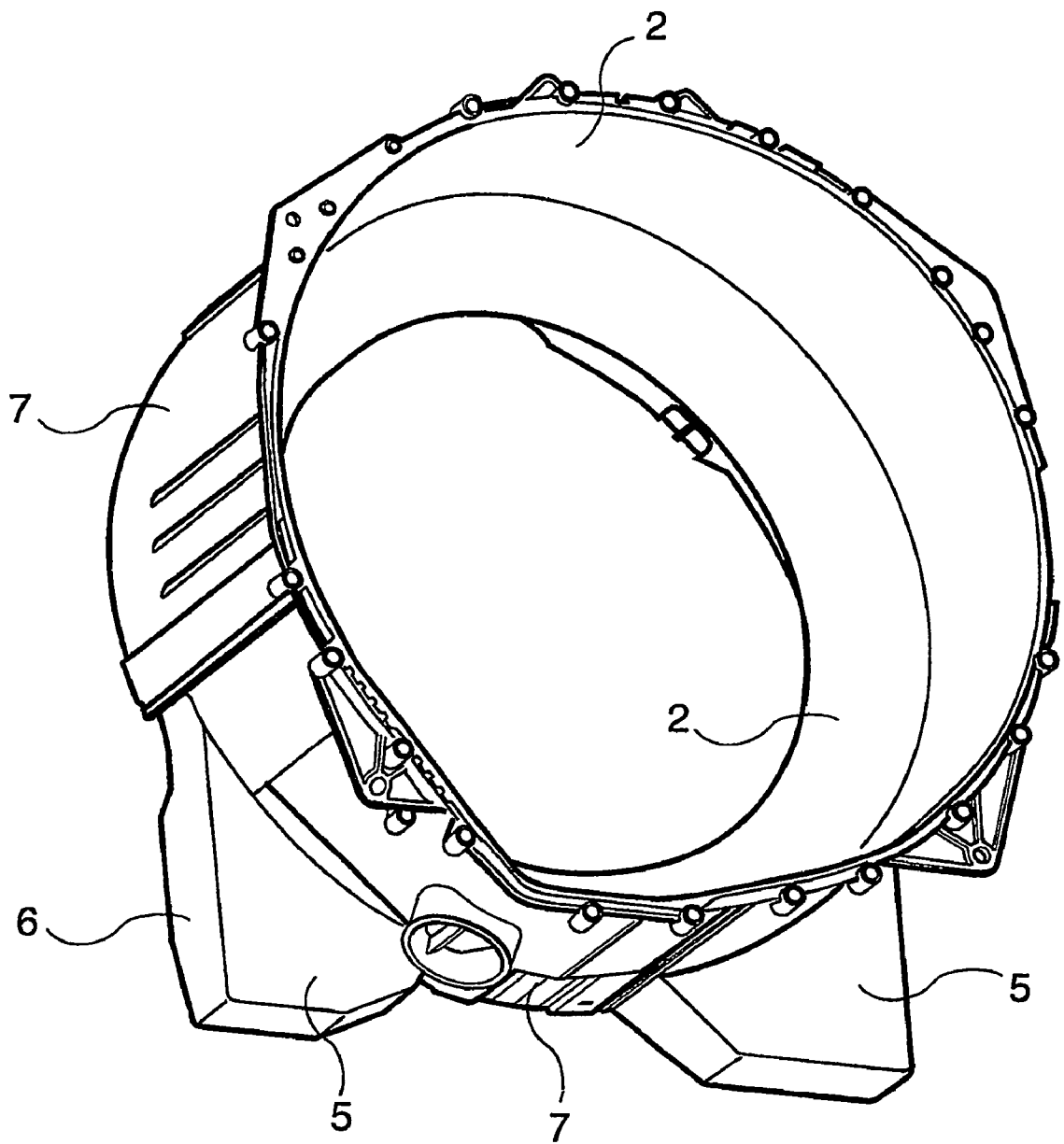
FIG. 3 is a rear perspective view of the counterweight according to the present invention fixed to a washing machine tub.

With reference to the FIGS. 1 to 3, an embodiment of a counterweight 1 connectable to a washing machine tub 2, according to the present invention, comprises an hollow shell 3 of U-shaped cross-section for containing a concrete ballast mass 4 poured therein.

Expediently said shell 3 is integrally provided in one piece with at least a foldable member 5 adapted to close at least a portion of said shell in order to encapsulate said mass 4.

The shell 3 is made of moulded plastic material and comprises a main annular body with two enlarged lower portion 6 of a downwards tapered shape which radially extend past the circumferential edge of the tub 2. The shell 3 is adapted to be filled with inert material mixed with water and additive, such as concrete or other material having similar properties, that are poured through the front open side of the shell 3.

The enlarged lower portions 6 of the shell 3 are provided to allow a larger material mass to be contained therein for increasing the whole ballast mass without affecting the washing machine casing overall dimensions.

Furthermore the shell 3 is sized so that the annular body adapts and fits against the front wall of the washing machine tub 2 in a position lying underneath protruding portion 7 of the same tub 2, so that the ballast mass 4 contained in the main annular body is enclosed between the shell 3 and the tub front wall. The protruding portions 7 are provided to accommodate the shell 3 and to allow the latter to be fixed to the tub 2 by means of bolt and nut-lock system.

The foldable member 5, integrally formed with the shell 3, substantially comprise a cover extending from a peripheral edge 8 of the shell 3 in correspondence to the enlarged lower portions 6. The peripheral edge 8 integrally provides pivotal sections 9 adapted to facilitate the rotation of the foldable member 5 around the edge 8 so that the ballast mass contained in the enlarged lower portion 6 are covered by said foldable member 5. That is to say the peripheral edge 8 acts as a hinge means for the foldable member 5.

The peripheral edge of the foldable member 5 comprise a clamping rim 10 adapted to snap engage a corresponding edge of the shell 3 to close the enlarged lower portion 6 and encapsulate the ballast mass.

In alternative embodiments of the present invention the foldable member 5 is connected to the corresponding edge of the shell 3 by welding, gluing, or other known technique or fixing means.

Conclusively, it can therefore be stated that the foldable member according to the present invention acts as a protective envelope capable of holding the crumbled and cracked material of the ballast mass, thereby doing away with the serious drawback shown by prior-art machines.

The invention claimed is:

1. Counterweight for connecting to a washing machine tub (2), comprising an hollow shell (3) of U-shaped cross-section containing a concrete ballast mass (4) poured therein, wherein said shell (3) is integrally provided in one piece with at least a foldable member (5) adapted to close at least a portion of said shell (4) in order to encapsulate said concrete ballast mass (4), wherein said foldable member (5) comprise a cover extending from a peripheral edge (8) of said shell (3) in correspondence to enlarged lower portions (6) thereof said peripheral edge (8) integrally provides pivotal sections (9) adapted to facilitate the rotation of said foldable member (5) around the peripheral edge (8) so that the ballast mass contained in the enlarged lower portion (6) are covered by said foldable member (5).

2. Counterweight according to claim 1, wherein foldable member (5) has a peripheral edge comprising a clamping rim (10) adapted to engage a corresponding edge of said shell (3) to close the enlarged lower portion (6) and encapsulate the ballast mass (4).

3. Counterweight for connecting to a washing machine tub (2), comprising an hollow shell (3) of U-shaped cross-section for containing a concrete ballast mass (4) poured therein, wherein said shell (3) is integrally provided in one piece with at least a foldable member (5) adapted to close at least a portion of said shell (4) in order to encapsulate said concrete ballast mass (4), wherein a peripheral edge (8) of said shell (3) integrally provides pivotal sections (9) adapted to facilitate the rotation of the foldable member (5) around the peripheral edge (8).

* * * * *